United States Patent [19]

Adaway et al.

[11] Patent Number: 4,864,673

[45] Date of Patent: Sep. 12, 1989

[54] FOLDING RAMP

[76] Inventors: David Adaway, #17 Klahaine Trailer Park, Fort Nelson, British Columbia V0C 1R0; John O'Connell, Box 983, 5304 Tamarack Crescent, Fort Nelson, British Columbia, both of Canada

[21] Appl. No.: 217,939

[22] Filed: Jul. 12, 1988

[51] Int. Cl.⁴ .......................... E01D 1/00; B65G 67/02
[52] U.S. Cl. ...................................... 14/71.1; 296/61; 414/537
[58] Field of Search .................. 414/537, 538; 296/61, 296/62; 14/71.1

[56] References Cited

U.S. PATENT DOCUMENTS

| | | | |
|---|---|---|---|
| 3,642,156 | 2/1972 | Stenson | 414/537 |
| 3,713,553 | 1/1973 | Curtis et al. | 414/537 |
| 3,737,058 | 6/1973 | Johnson | 414/537 |
| 3,756,440 | 9/1973 | Raap et al. | 414/537 |
| 4,294,571 | 10/1981 | Tordella | 414/537 |
| 4,455,119 | 6/1984 | Smith | 414/537 |
| 4,601,632 | 7/1986 | Agee | 414/537 |
| 4,624,619 | 11/1986 | Uher | 414/537 |
| 4,700,421 | 10/1987 | Gladney et al. | 414/532 X |

FOREIGN PATENT DOCUMENTS 747815  4/1956  United Kingdom .................. 296/61

Primary Examiner—David A. Bucci
Attorney, Agent, or Firm—Christie, Parker & Hale

[57] ABSTRACT

A collapsible ramp comprising an attachment frame, a foldable support structure mounted to the attachment frame by pivotable hinges, and a telescoping deck structure of interconnected, essentially rectangular plates. The foldable support structure has longitudinal support members with foldable joints intermediate along the lengths of the members, and these members are pivotally connected to the hinge. The ramp can be formed into an extended state in which the longitudinal support members are extended outwardly from the attachment frame and the rectangular plates of the telescoping deck structure are extended and supported on the support members. Alternatively, the ramp can be formed into a collapsed state in which the support members are folded back on themselves using the foldable joints and folded inwardly pivoting about the hinges so that the support members are housed within the attachment frame, the telescoping deck structure being retracted to cover the folded rails on the attachment frame.

15 Claims, 4 Drawing Sheets

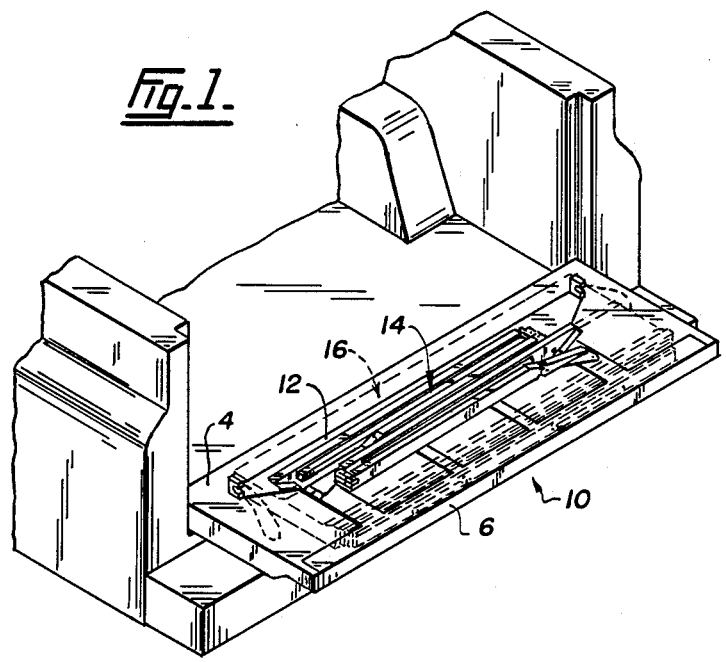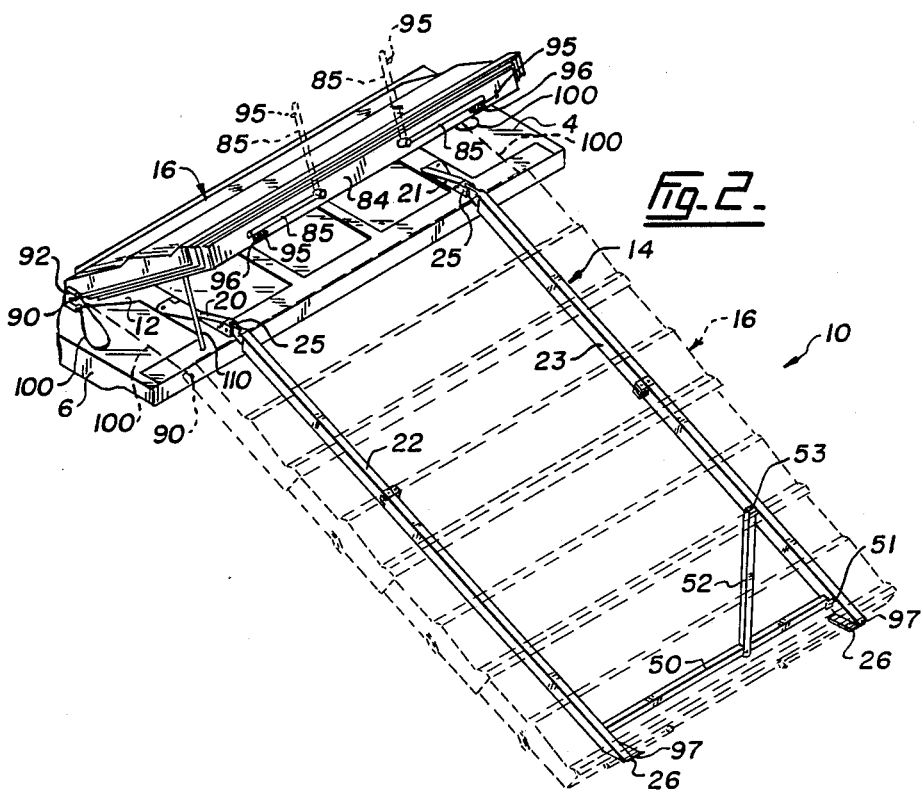

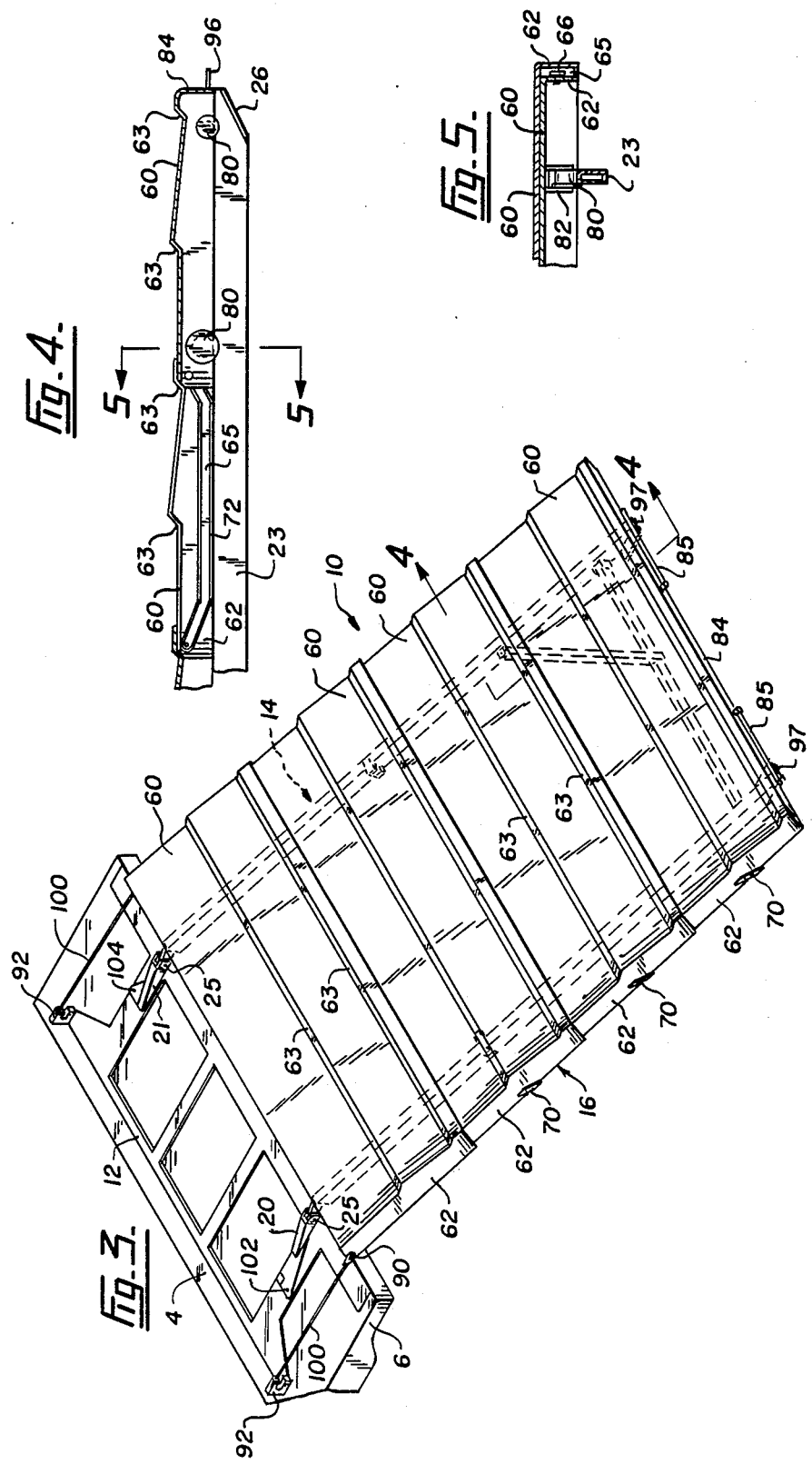

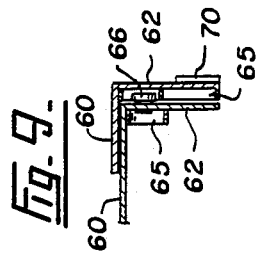
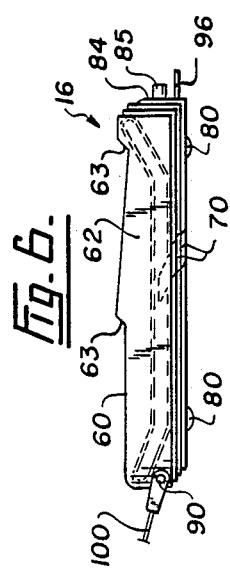
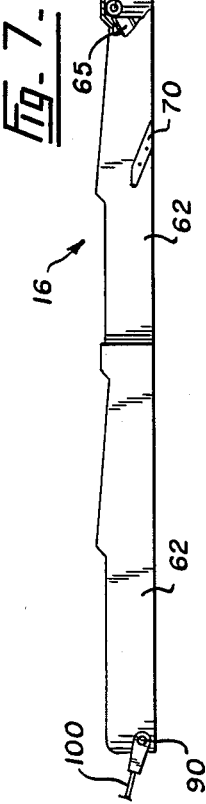
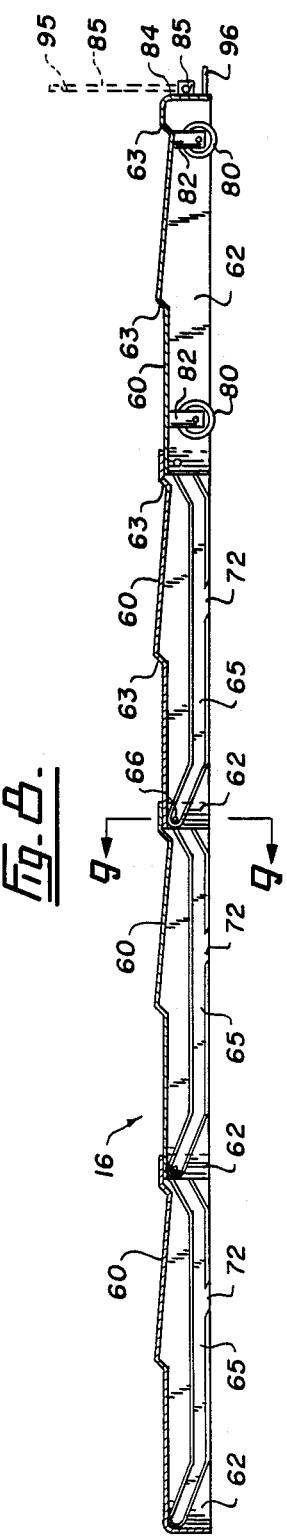

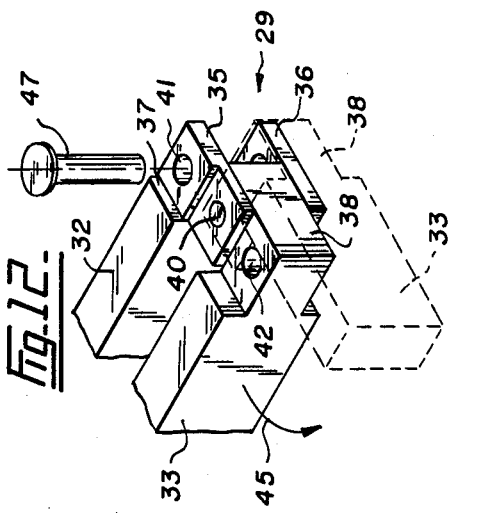
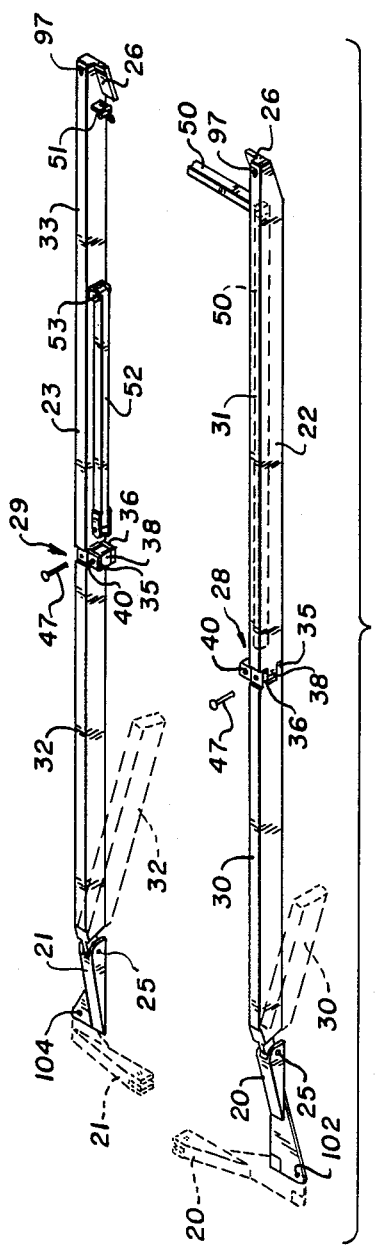
Fig. 10.
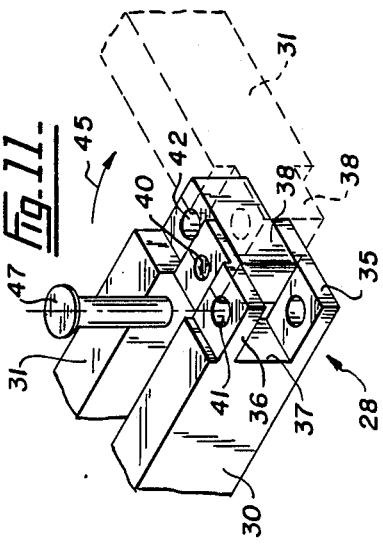

{ 4,864,673 }

FOLDING RAMP

FIELD OF THE INVENTION

This invention relates to a collapsible ramp suitable for use on the bed of a pickup truck.

DESCRIPTION OF THE PRIOR ART

Collapsible ramps are a very useful accessory for pickup trucks. They are designed to bridge the distance between the deck of the truck and the ground to ease the loading of articles into the bed. These ramps are particularly useful when loading or unloading powered wheeled vehicles such as snowmobiles, motorcycles, all terrain vehicles and the like. The collapsible nature of the ramps allows them to be stored without significantly decreasing the cargo area of the pickup bed.

Examples of prior art collapsible ramps are shown in Wilson, U.S. Pat. Nos. 3,352,440, Stenson 3,642,156, Guidry 4,571,144 et al.

Wilson discloses a loading ramp that is attached to the tail gate of a pickup truck, the ramp being hinged midway along its length for folding over on itself when being stored.

Stenson teaches a loading ramp that uses folding sections of progressively smaller width so that each section can be folded under the previous section. The folded ramp is stored on the outer surface of the tail gate.

Guidry et al. discloses a tailgate ramp that is pivotally connected to the tailgate. A scissor type linkage joins the sections of the ramp together and allows them to be folded compactly and stored on the inside surface of the tailgate.

The present invention provides a collapsible ramp that is extremely compact in its collapsed state by virtue of a telescoping deck system and a foldable support structure not shown in the prior art.

SUMMARY OF THE INVENTION

Accordingly, the present invention is a collapsible ramp comprising:

an attachment frame;

a foldable support structure mounted to said attachment frame by pivotable hinge means, said foldable support structure having longitudinal support members with foldable joints intermediate along the lengths of the members, said members being pivotally connected to said hinge means; and telescoping deck means comprising essentially rectangular plates joined by interconnecting means;

said ramp being foldable from an extended state in which said longitudinal support members are extended outwardly from said attachment frame and said rectangular plates of said telescoping deck means are extended and supported on said support members to a collapsed state in which said support members are folded back on themselves using said foldable joints and folded inwardly pivoting about said hinge means so that said support members are housed within said attachment frame, said telescoping deck means being retracted to cover said folded rails on said attachment frame.

The present invention provides a lightweight yet rugged collapsible ramp that is stored at its operating location and allows a single person to load or unload heavy articles from the bed of a pick-up truck quickly and efficiently.

BRIEF DESCRIPTION OF THE DRAWINGS

A preferred embodiment of the present invention is illustrated in the following drawings in which:

FIG. 1 is a preferred embodiment of the collapsible ramp shown in collapsed form and mounted to the gate of a pickup truck.

FIG. 2 shows the foldable support structure in its extended position.

FIG. 3 shows the telescoping deck structure in its extended position.

FIG. 4 is cross-section taken through the deck structure along line 4—4 of FIG. 3.

FIG. 5 is a section view taken along line 5—5 of FIG. 4.

FIG. 6 shows the telescoping deck plates in their collapsed state.

FIG. 7 shows the deck plates in their extended position.

FIG. 8 is a section view of the extended deck plates.

FIG. 9 is a section view taken along line 9—9 of FIG. 8.

FIG. 10 shows the foldable support members with foldable joints.

FIG. 11 and 12 are detailed views of the foldable joints of the support members.

DESCRIPTION OF THE PREFERRED EMBODIMENTS

Referring now to FIGS. 1, 2 and 3, there is shown a collapsible ramp 10 according to the present invention mounted to the inside surface 4 of a tailgate 6 of a conventional pickup truck.

The collapsible ramp 10 comprises an attachment frame 12 that is mounted to inside surface 4, a foldable support structure 14, and a telescoping deck structure 16.

Attachment frame 12 comprises a flat plate that is preferably mounted to the inside surface 4 of the tailgate 6 by suitable fastening means such as bolts or the like. Pivotally attached to attachment frame 12 are hinges 20 and 21. Foldable support members 22 and 23 are pivotally attached to hinges 20 and 21 respectively. Hinges 20 and 21, and support members 22 and 23 make up the foldable support structure of the collapsible ramp.

FIG. 10 shows the support members and hinges in greater detail. Each support member terminates in an angled pad 26 for resting on the ground when the ramp is in its extended position. Intermediate along the length of support members 22 and 23 are foldable joints 28 and 29 respectively. Joint 28 divides support member 22 into upper section 30 and lower section 31 and joint 29 divides support member 23 into upper section 32 and lower section 33. Upper sections 30 and 32 are attached to hinges 20 and 21 and allow the support members to pivot about joints 25.

Joints 28 and 29 are of a type that allow lower sections 31 and 33 to be folded inwardly through 180 degrees so that the sections 31 and 33 are parallel and adjacent corresponding upper sections 30 and 32. Such an arrangement allows the support members to be folded into a compact configuration when storing the collapsible ramp.

Joints 28 and 29 are shown in detail in FIGS. 11 and 12. In the embodiment shown, each joint comprises a pair of spaced, parallel flanges 35 and 36 extending across the end face 37 of an upper section at right angles to the longitudinal axis of the upper section such that the flanges have a portion that protrudes past a side face of the section. In a similar manner, lower sections 31 and 33 are each formed with a corresponding flange 38 extending across the end face of the lower section at right angles to the longitudinal axis of the lower section, the protruding portion of the flange being adapted to fit between the protruding portion of spaced flanges 35 and 36. Hinge pin 40 extends through flange 35, flange 38 and flange 36 to connect the joint together. Flanges 35 and 36 are also formed with aligned passages 41 therethrough, and flange 38 is formed with passage 42 therethrough.

FIGS. 11 and 12 show the joints in their folded position where lower section 31 and 33 are parallel and adjacent upper sections 30 and 32 respectively. Lower sections 31 and 33 are pulled outwardly in the direction shown by arrow 45 to pivot the lower section about pin 40 as shown by the dashed lines. Lower sections 31 and 33 are pivoted until flange 38 is contained between flanges 35 and 36. At this point, passages 41 and 42 are aligned so that a locking pin 47 can be inserted through the joint to lock it into an extended position. Preferably, these locking pins are mounted to a support member by a short length of chain (not shown) so that the pins are not easily lost.

FIG. 2 shows the support members 22 and 23 in an extended position. Joints 25 at hinges 20 and 21 allow the support members to pivot downwardly from the rear of tailgate 6. The support members are also equipped with bracing members 50 and 52. Bracing member 50 is pivotally connected to support member 22 and can be pivoted downwardly to engage with a holding bracket 51 on support member 23. Bracing member 50 serves to space apart the two support members. Additional bracing is provided by bracing member 52 which is pivotally attached at 53 to support member 23. Member 53 is extended to engage member 50 at a point along member 50's length.

Turning now to FIG. 3, there is shown the telescoping deck structure 16 of the present invention. This deck structure is pulled over the support members, shown in dashed lines, to provide a ramp surface for loading articles into the bed of a pickup truck. The telescoping deck structure is comprised of a series of interconnected deck plates 60 of progressively smaller size. In the illustrated embodiment, the telescoping deck structure is made up from four plates, however, the present invention is not limited to this number of plates.

Each deck plate comprises an essentially rectangular plate, the shorter sides of the plates being formed into downwardly extending side walls 62. The deck plates therefore have an inverted U-shape, the interior of the U of one plate housing the next smaller plate when the plates are in their collapsed position as shown in FIG. 6. Preferably, the deck plates 60 are formed from relatively thin aluminium plates for light weight and these plates have their upper surface formed into a series of transverse ridges 63 to provide rigidity to the deck structure. As well, the transverse ridges 63 create a ridged surface thereby providing anti-slip protection to the ramp.

The deck plates are interconnected by means of a guide track and roller system. On the inner surface of side walls 62 of each plate, there are formed guide tracks 65 as best shown in FIG. 8. On each plate, rollers 66 mounted to the outer surface of side walls 62 at the upper front corners of the side walls engage and move within the guide tracks of a preceding larger deck plate.

This arrangement is shown in FIG. 9. Guide tracks 65 are formed with upwardly angled start and end sections separated by a straight section. This configuration spaces the upper surfaces of the deck plates apart as they are telescoped inwardly or outwardly to avoid jamming of the surfaces and to ease the force required to move the plates.

Preferably, the side walls 62 of each plate are also provided with lifting members 70 best shown in FIG. 7. These angled members engage in slots 72 formed in guide tracks 65 when the ramp is in a collapsed state as shown in FIG. 6. When the deck plates are telescoped outwardly, lifting members 70 will slide out of slots 72 and along the underside of guide tracks 65 thereby serving to lift and space apart the plates from each other.

The various deck plates of the telescoping deck structure have essentially the same shape and form except that the plates become smaller moving down the ramp. In addition, the uppermost and lowermost plates have a few additional features. For example, the lowermost plate does not require guide tracks 65, just as the uppermost plate does not require rollers 66 or lifting members 70. Other differences are outlined below.

Referring to FIG. 4, there is shown a section view of the deck structure. This section view shows rollers 80 which are mounted to the interior of the lowermost deck plate. As shown in FIG. 5, these rollers are rotatably mounted in brackets 82 and are positioned to run atop support member 22 and 23 in order to smooth the travel of the deck down the support members when the ramp is being extended.

The lowermost deck plate is also provided with pivoting handles 85 mounted to the rear edge 84 of the plate. These handles can be pivoted upwardly as shown by dotted lines in FIG. 8 to provide a pair of grips by which a pushing or pulling force can be applied to the ramp structure in order to extend or collapse the ramp. When not in use the handles can be pivoted to a stored position where they are parallel to rear edge 84 and out of the way.

The uppermost deck plate is provided with pivotally mounted projections 90 that engage in hooks 92 formed in attachment frame 12 as shown in FIG. 3. Projections 90 also provide a mounting point for cables 100 that connect the uppermost deck plate and therefore the entire ramp structure to the attachment plate 12 at hooks 92.

In use, the ramp of the present invention is stored in the collapsed form shown in FIG. 1. Support members 22 and 23 are folded back on themselves using joints 28 and 29. In FIG. 10, note how hinge 20 is pivotally mounted to attachment frame 12 at point 102 that is behind the pivotal mounting point 104 of hinge 21. This arrangement allows folded support members 22 and 23 to be pivoted inwardly about hinges 20 and 21 such that the folded members will lie beside each other on top of attachment frame 12. Telescoping deck structure 16 is collapsed and projections 90 of the uppermost plate are fitted into hooks 92 and the plates pivoted down to cover the folded support structure. The ramp is now in its stored state. Preferably, attachment means (not shown) are provided on the deck plates to secure the plates to the attachment frame so that the tailgate 6 can be raised to a shut position.

The process of extending the collapsible ramp structure proceeds as follows:

First, handles 85 are rotated upwardly to a vertical position. Using the handles, the telescoping deck structure is pivoted upwardly as projections 90 rotate in hooks 92. As shown in FIG. 2, if desired, a propping member 110 may be used to temporarily support the deck structure. Propping member 110 comprises a longitudinal rod that is pivotally mounted to the inside surface of a side wall of the lowermost deck plate. When not being used the propping member is retained by a clip (not shown) attached to the underside of the deck plate.

Supports members 22 and 23 are pivoted about hinges 20 and 21 until they extend at approximately right angles to the tailgate 6. The members are then unfolded about joints 28 and 29 to their full length and locking pins 47 inserted. Bracing members 50 and 52 are then pivoted into place. Next, propping member 110 can folded out of the way to its stored position and handles 85 used to pull the telescoping deck structure down the support members 22 and 23, the guide tracks and rollers and the lifting members and slots of the deck plate ensuring a smooth telescoping action. As the deck structure is pulled out, projections 90 will release from hooks 92 and cables 100 will ensure that the deck remains attached to attachment frame 12. As a final step, handles 85 can be rotated to their out of the way position. Handles 85 are formed with protruding pins 95 that are positioned to fit through brackets 96 and into receiving holes 97 formed in support members 22 and 23. This arrangement serves to lock the entire ramp structure in place on the support members. The ramp is then in its extended state as shown in FIG. 3.

Forming the ramp into its collapsed state is simply a matter of reversing the above steps.

The angle of the ramp structure of the present invention can be adjusted by raising or lowering the angle at which tailgate 6 is supported. Conventionally, the tailgate is supported by a cable, pivoting bar or chain (not shown) extending between the gate and the walls of the pickup bed. By lengthening this connection, the angle of the tailgate can be adjusted. The pivotal connection at 25 between hinges 20 and 21 and support members 22 and 23, respectively, allow the ramp to adjust to any change of tailgate angle.

The collapsible ramp of the present invention provides a lightweight, yet rugged structure which has a number of advantages.

The ramp is stored in an area of approximately one quarter its extended size and the ramp is stored at its operating location.

When stored, the present invention does not interfere with the normal use or storage area of a pickup truck box.

Finally, one person can easily collapse and extend the ramp making it possible to load or unload a self propelled machine quickly and efficiently.

We claim:

1. A collapsible ramp comprising:
   an attachment frame;
   a foldable support structure mounted to said attachment frame by pivotable hinge means, said foldable support structure having longitudinal support members with foldable joints intermediate along the lengths of the members, said members being pivotally connected to said hinge means; and
   telescoping deck means comprising essentially rectangular plates joined by interconnecting means;
   said ramp being foldable from an extended state in which said longitudinal support members are extended outwardly from said attachment frame and said rectangular plates of said telescoping deck means are extended and supported on said support members to a collapsed state in which said support members are folded back on themselves using said foldable joints and folded inwardly pivoting about said hinge means so that said support members are housed within said attachment frame, said telescoping deck means being retracted to cover said folded rails on said attachment frame.

2. A collapsible ramp as claimed in claim 1 in which said rectangular plates of said telescoping deck means have downwardly extending side walls to form an inverted U-shaped cross-section, said side walls having an outer surface and said side walls having an inner surface that encloses an interior region into which succeeding smaller rectangular plates are slidably fitted.

3. A collapsible ramp as claimed in claim 2 in which said interconnecting means comprises guiding tracks formed on the inner surface of said side walls, and rollers mounted to the outer surface of said side walls, the rollers of one rectangular plate slidably engaging in the guiding tracks of a preceding larger plate.

4. A collapsible ramp as claimed in claim 2 in which said telescoping deck plates include upstanding lifting members on the outer surface of said side walls and retaining slots formed on the inner surface of said side walls, the lifting members of one rectangular plate engaging in the retaining slots of a preceding larger plate when said plates are telescoped within each other, said lifting members being adapted to engage against said deck plates as said plates are being extended and acting to lift and separate said plates to ease the movement into said extended state.

5. A collapsible ramp as claimed in claim 4 in which said retaining slots are formed in said guide tracks.

6. A collapsible ramp as claimed in claim 1 in which each of said rectangular plates is formed with a transverse ridge to provide rigidity to said plate and to provide traction on an extended deck surface.

7. A collapsible ramp as claimed in claim 1 in which said rectangular plates are constructed from aluminium.

8. A collapsible ramp as claimed in claim 1 including foldable bracing means attached to said support members comprising a longitudinal member pivotally mounted to one support member and extendable between the support members.

9. A collapsible ramp as claimed in claim 8 including a further bracing member pivotally mounted to a support member and extendable between said one support member and said longitudinal member.

10. A collapsible ramp as claimed in claim 1 including pivotable handle means comprising at least one longitudinal rod pivotally mounted by one end to one of said essentially rectangular plates and pivotable between a vertical grasping position and a horizontal stored position.

11. A collapsible ramp as claimed in claim 10 including locking means to lock said essentially rectangular plates into said extended state, said locking means comprising a pin protruding from said longitudinal rods of said handle means and a corresponding cavity formed in at least one of said longitudinal support members adapted to receive and retain said pin when said handle means is pivoted to its stored position thereby interlocking said deck plate and said support members.

12. A collapsible ramp as claimed in claim 1 in which at least one of said telescoping essentially rectangular plates is attached to said attachment frame by an anchoring cable.

13. A collapsible ramp as claimed in claim 1 in which at least one of said telescoping essentially rectangular plates is equipped with rollers aligned to run along said extended support members to ease movement of said deck means along said extended members.

14. A collapsible ramp as claimed in claim 1 in which each of said foldable joints connects a first and second segment of said longitudinal support members, said joint comprising:
   first and second spaced, parallel flanges extending across an end face of said first segment at right angles to a longitudinal axis of the first segment such that the flanges have a portion that protrudes past a side face of the first portion;
   a third flange formed across an end face of said second section at right angles to a longitudinal axis of the lower section such that the third flange has a portion that protrudes past a side face of the second portion, the protruding portion of the third flange being adapted to fit between the protruding portions of said first and second flanges;
   a hinge pin extending between said protruding portions of said first and second flanges and through said protruding portion of said third flange to pivotally connect said first and second segments such that said second segment can be rotated from a folded position adjacent and parallel said first segment through 180 degrees to an extended position where the longitudinal axes of said first and second segments are co-linear.

15. A collapsible ramp as claimed in claim 14 including locking means comprising:
   aligned holes extending through said first and second flanges;
   a hole through said third flange; and
   a removable pin whereby when said second segment is rotated to an extended position relative to said first segment, said aligned holes in said first and second flanges align with said hole in said third flange to form a passage to accept said removable pin to lock said second segment into position.

* * * * *